M. A. BARBER.
AUTOMATIC TRAIN PIPE COUPLING.
APPLICATION FILED APR. 8, 1918.
1,347,986.
Patented July 27, 1920.
2 SHEETS—SHEET 1.
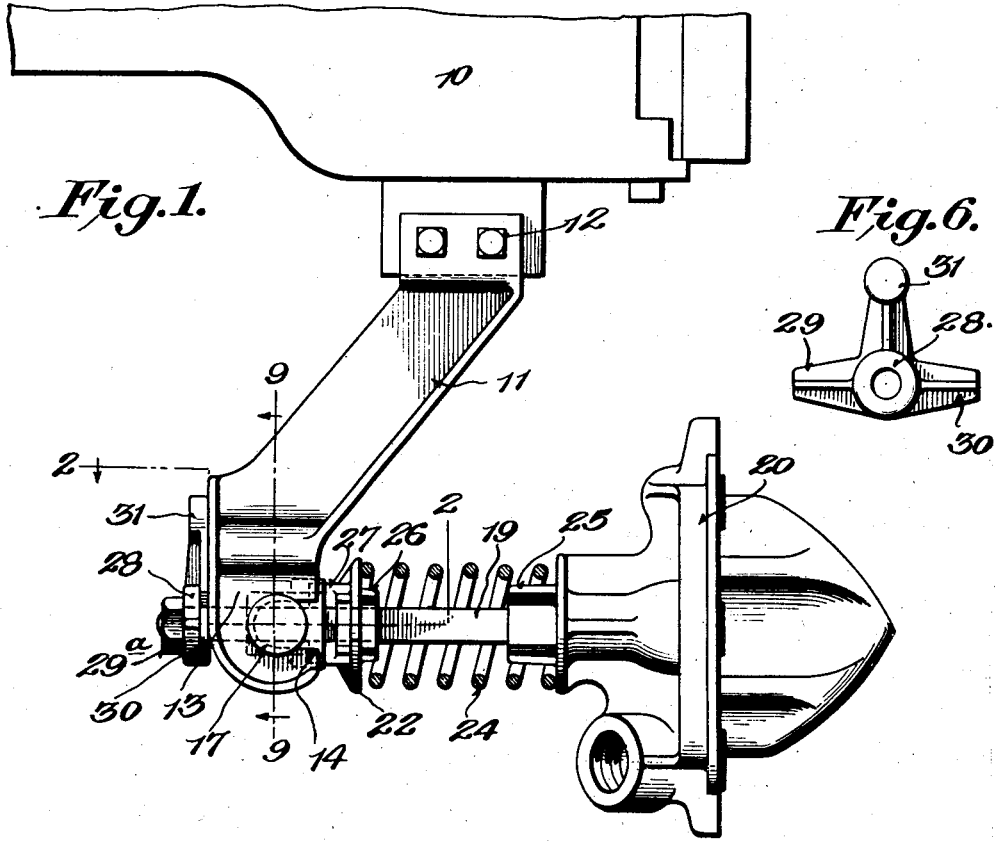
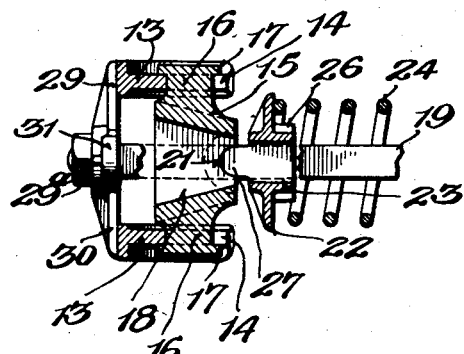
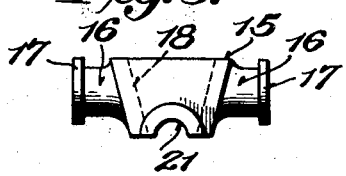
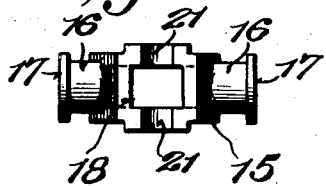
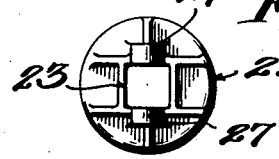
Inventor
Martin A. Barber

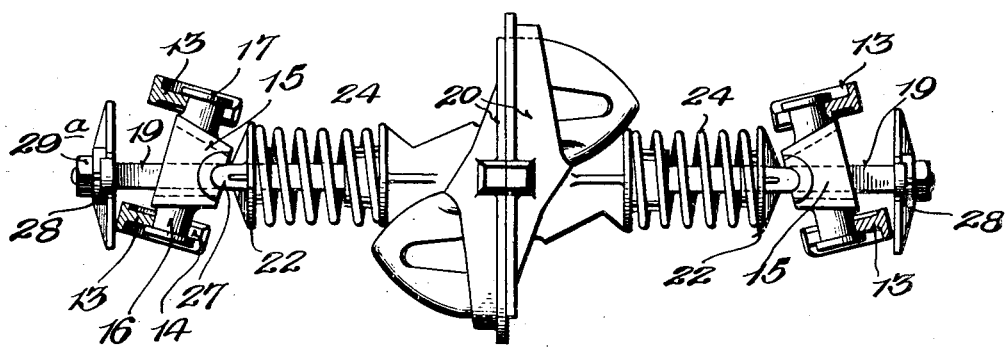
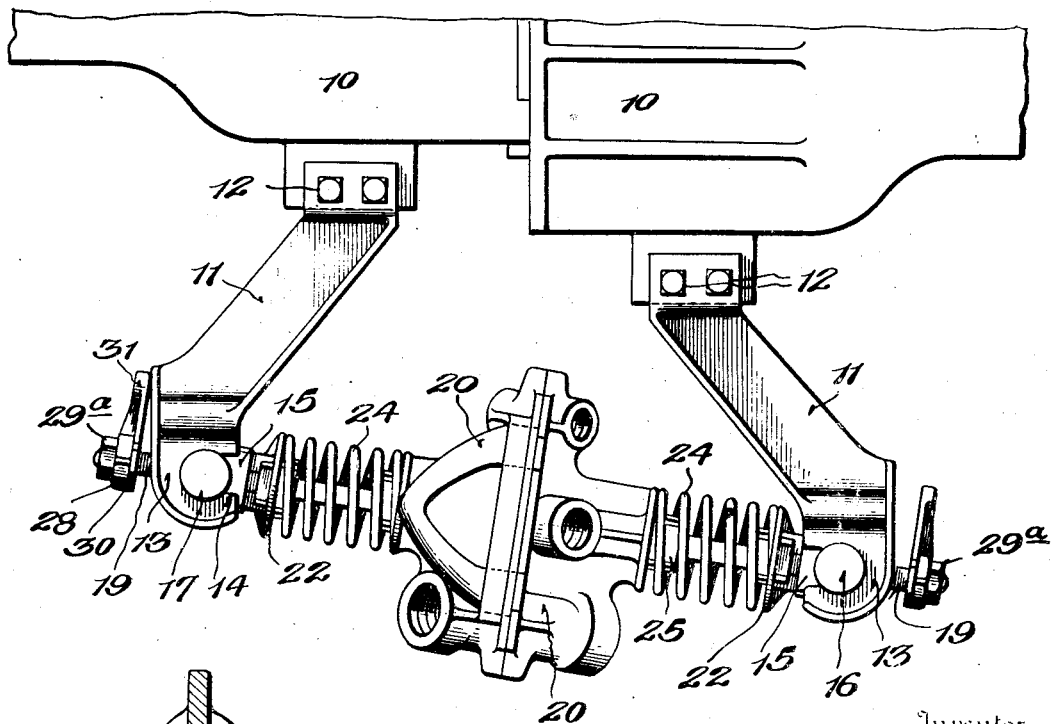
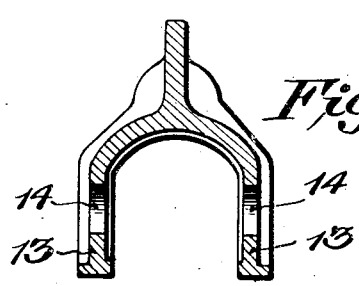

UNITED STATES PATENT OFFICE.

MARTIN A. BARBER, OF CLEVELAND, OHIO, ASSIGNOR TO THE AMERICAN AUTOMATIC CONNECTOR COMPANY, OF CLEVELAND, OHIO, A CORPORATION OF OHIO.

AUTOMATIC TRAIN-PIPE COUPLING.

1,347,986.        Specification of Letters Patent.      Patented July 27, 1920.

Application filed April 8, 1918. Serial No. 227,330.

*To all whom it may concern:*

Be it known that I, MARTIN A. BARBER, a citizen of the United States, and residing at Cleveland, county of Cuyahoga, State of Ohio, have invented certain new and useful Improvements in Automatic Train-Pipe Couplings, of which the following is a specification.

The present invention relates to automatic train pipe couplings and more particularly to an improved construction and arrangement for supporting the coupler head so that it has pivotal movement on bearings in at least two directions.

The principal object of the invention is to improve the construction described in the patent to Moler No. 1,161,403 granted November 23, 1915. As disclosed in this patent, the means for pivotally supporting the coupler head consists of a spring seat having pins arranged in slots in the supporting bracket. While this structure permits the coupler to rock easily in a vertical direction, the rocking movement in a horizontal direction is not on any substantial bearing surfaces, all the load being thrown on the narrow edge bounding the inner end of one of the slots. According to the present invention a pivot block is rotatively carried by the supporting bracket and a spring seat having a bearing on the block for rocking movement about an axis at right angles to the axis of the block, is interposed between the block and the end of the spring which acts to project the coupler head.

The features of the invention will be apparent from the description taken in connection with the drawings in which—

Figure 1, is a side elevation of a train pipe coupler constructed in accordance with the present invention;

Fig. 2 is a sectional plan view of a portion of the device taken substantially on the line 2—2 of Fig. 1;

Fig. 3 is a top plan view of the pivot block;

Fig. 4 is a front elevation of the pivot block;

Fig. 5 is a rear elevation of the spring seat;

Fig. 6 is a rear elevation of the abutment adapted to be secured to the end of the spindle of the coupler head;

Fig. 7 is a plan view illustrating the position of the parts of an engaged pair of couplers when the respective cars to which the couplers are attached are on a curve, the supporting brackets being shown in section;

Fig. 8 is a side elevation of a pair of engaged couplers illustrating the position of the parts when the drawbar on one car is lower than that of the other; and Fig. 9 is a sectional elevation taken substantially on the line 9—9 of Fig. 1.

As shown in the drawings, the train pipe coupler is secured to the drawbar 10 of the draft rigging of a car by means of a supporting bracket 11. The bracket is secured to the under side of the drawbar by any suitable means such as by the bolts 12 and extends downwardly and rearwardly, the lower end having the spaced arms 13 formed with the alined slots 14 open at the front side of said arms. A pivot block 15 has the trunnions 16 fitted in said slots so that the block is supported for rocking movement about a horizontal axis. The ends of the trunnions 16 are provided with the flanges 17 which bear against the outside surfaces of the arms 13, thereby preventing movement of the block transversely of the arms. The block is also formed with an aperture 18 which is shown in Fig. 4 as rectangular in cross section and adapted to receive the rectangular spindle 19 of the coupler head 20. As clearly shown in Fig. 2, this aperture is wider at the rear face of the block than at the forward face in order to permit angular movement of the spindle with respect to the block, as illustrated in Fig. 7. The front face of the pivot block above and below the aperture 18 is formed with the substantially cylindrical bearing surfaces 21.

A spring seat 22 is arranged in front of the pivot block and is formed with a rectangular aperture 23 for the spindle 19. A spring 24 is interposed between the seat 22 and the head 20 and acts to force the head away from the supporting bracket. In order to properly center the spring 24, the coupler head has the four ribs 25, the outer surfaces of which are arranged concentric to the axis of the spindle 19 and engage the interior of the spring 24 at the coupler head end thereof. The spring seat 22 is formed with four similar ribs 26 which engage the interior of the opposite end of the spring. The face of the spring seat opposite the ribs 26 is provided with the two lugs 27, which have substantially semicylindrical surfaces adapted to be seated in the bearing surfaces 21 of the pivot block. It will be observed that the engagement of the lugs 27 with the pivot block provides a pivotal connection between these parts which permits rocking movement about an axis perpendicular to the axis of the pivot block. The spring 24 in addition to performing the function of holding the coupler head in projected position and permitting it to yield when two couplers are joined, also acts to hold the spring seat and pivot block in their operative positions.

In order to limit the extent to which the coupler head is projected from the supporting bracket, an abutment 28 may be threaded on the end of the spindle 19 and securely held by means of a lock nut 29. As shown in Fig. 6, this abutment may be formed with the three arms 29, 30 and 31, the arms 29 and 30 adapted to engage the rear edges of the arms 13 of the supporting bracket and the arm 31 adapted to bear against a portion of the bracket just above the arms. In this manner the abutment bears against the bracket at least three separated points thereby with the aid of the spring 24 holding the coupling head in substantially horizontal position.

In service when the cars are rounding a curve which causes the drawbar of one car to turn relative to the drawbar of the other, pivotal movement between the coupler head and the supporting bracket may take place about the axis of the bearing between the spring seat and the pivot block so that the contacting faces of the coupler heads may remain in contact. The positions of the parts for such contacts are illustrated in Fig. 7. It will be seen that as the abutment 28 is out of contact with the bracket that the coupler heads are in effect floatingly supported between their respective brackets. In other words pivotal movement of either coupler head with respect to its supporting bracket may take place without any resistance in two different directions. In service of course there is considerable relative vertical movement of one drawbar with respect to the other due to inequalities in the track. The pivotal engagement of the pivot block in the supporting brackets takes care of this relative movement of the drawbars, as clearly illustrated in Fig. 8. It will further be apparent that a combination of the rocking movements illustrated in Figs. 7 and 8 is permitted just as well as either one of the movements separately.

It is to be observed that the rocking movement of the coupler head does not in any way distort the spring 24, that is to say the seats supporting the ends of the spring always move with the coupler head so that as far as this movement is concerned the coupler head with its spindle, the spring 24 and spring seat 22 constitute a unitary structure. Furthermore by providing a construction by which the spring is arranged between the coupler head and pivots, the latter are positioned at the maximum distance from the face of the coupler head so that the extent of angular movement on the pivots is a minimum, thus reducing wear on these parts. It is to be noted also that the bearing areas for the pivots of the pivot block and for the spring seat are large, so that the bearing pressures per square inch are small, thus reducing wear. The entire device may be made from castings which require no machine work except the thread on the nut of the spindle 19. Consequently the cost of the coupling is a minimum.

The polygonal spindle slidable in the correspondingly shaped aperture in the spring seat prevents rotation of the coupler head about its longitudinal axis, that is, the axis of the spindle. Thus the head is always held in proper position to engage a like head so that the two may be coupled together.

Although a specific embodiment of the invention has been described, it is to be understood that changes in details and arrangement may be made without departing from the invention as expressed in the appended claims.

Having thus described the invention what is claimed as new and desired to be secured by Letters Patent is:

1. In an automatic train pipe coupling, the combination with the supporting bracket and coupler head, said bracket having two spaced arms depending from its lower end formed with alined slots extending inwardly from one edge; of a pivot block having trunnions arranged in said slots, a spring seat pivoted on said block for rocking movement about an axis perpendicular to the axis of said trunnions and a spring interposed between said seat and head.

2. In an automatic train pipe coupling, the combination with the supporting bracket and coupler head; of a pivot block removably pivoted on said bracket formed with a bearing seat at the front face of the block at right angles to its pivotal axis, a spring seat having a bearing lug associated with said bearing seat and a spring interposed between said spring seat and head.

3. In an automatic train pipe coupling, the combination with the supporting bracket and coupler head, said bracket having two spaced arms depending from its lower end formed with alined slots extending inwardly from one edge; of a pivot block having trunnions arranged in said slots and formed with a bearing seat at right angles to the axis of said trunnions, a spring seat having a bearing lug associated with said bearing seat and a spring interposed between said spring seat and head.

4. In an automatic train pipe coupling, the combination with a supporting bracket having two spaced depending arms at its lower end, said arms being provided with slots extending inwardly from one edge, and a coupler head having a rearwardly extending spindle; of a pivot block having trunnions disposed in said slots in said arms for rocking movement about a horizontal axis, a spring seat in front of said block and pivoted on the front face thereof for rocking movement about a vertical axis, said block and seat being formed with alined apertures, a coil spring interposed between said head and seat, said spindle extending through said spring and apertures to the opposite side of said bracket, and an abutment on the end of said spindle adapted to engage the bracket when the coupling is in uncoupled position.

5. In an automatic train pipe coupling, the combination with a supporting bracket having two spaced depending arms at its lower end, each of said arms being provided with a slot extending inwardly from one edge thereof, of a pivot block having trunnions arranged to enter the slots, said trunnions being provided with end flanges for preventing longitudinal movement of the pivot block along the axis of the trunnions.

6. In an automatic train pipe coupling, the combination with a supporting bracket having two spaced depending arms at its lower end, each of said arms being provided with a slot extending inwardly from one edge thereof, of a pivot block having trunnions arranged to enter the slots, said trunnions being provided with end flanges for preventing longitudinal movement of the pivot block along the axis of the trunnions, said pivot block having semi-circular recesses on one face of the block, and a spring seat provided with lugs having curved portions arranged to enter said semi-circular recesses for pivoting the spring seat on the block.

7. In an automatic train pipe coupling, a bracket, a pivot block carried by said bracket, said pivot block having an opening there through tapering toward its front face, and being provided with recesses on its front face, a spring seat having portions adapted to enter said recesses, said spring seat being pivoted to the pivot block by said portions and adapted to have a movement at right angles to the plane of movement of the pivot block, a slidable spindle extending through said pivot block and through said spring seat, a coupler head carried by said spindle at one end thereof, and a spring disposed between said spring seat and said coupler head.

8. In an automatic train pipe coupling, the combination with a supporting bracket, of a pivot block mounted for oscillatory movement on the bracket, a spring seat bearing against the forward face of the pivot block and arranged to oscillate thereon on an axis at right angles to the axis of oscillation of the block, a coupler head, a compression spring between the coupler head and the spring seat, and a shank extending from the coupler head through the spring seat, the pivot block and the bracket, and carrying a stop adapted to coact with the rear face of the bracket.

9. The combination of a bracket having a bifurcated lower end, each arm of the bracket having a horizontal slot open toward the front, a pivot block lying between the arms and having trunnions occupying said slots, a coupler head, a shank connected therewith and extending through the pivot block, a spring seat surrounding the shank and bearing movably against the front face of the pivot block, and a spring surrounding the shank and compressed between the coupler head and spring seat, and a stop on the rear end of the shank adapted to bear against the rear edge of the bracket.

10. The combination with a bracket, of a pivot block pivoted thereto and having a flaring opening through it, a coupler head, a shank therefor extending through the opening of the pivot block and having a pivotal bearing thereon at right angles to the direction of flare, and a compression spring surrounding the shank and tending to force the head away from the pivot block.

11. The combination with a bracket, of a pivot block pivoted thereto and having an opening through it flaring toward the rear, a coupler head, a shank therefor extending through the opening of the pivot block, a compression spring surrounding the shank and pressing against the head, and a spring seat loosely surrounding the shank between the spring and pivot block and bearing against the pivot block.

12. The combination of a bracket having a pair of open-ended slots side by side, a pivot block having integral trunnions occupying said slots, shoulders on the block preventing lateral displacement thereof, a coupler head and a compression spring between it and the pivot block.

13. The combination of a bracket having a pair of open-ended slots side by side, a pivot block having trunnions occupying said slots, a spring seat bearing against the block, a coupler head, a compression spring between it and the spring seat, and a shank extending from the head through the spring seat and the pivot block, said shank being longitudinally slidable through the seat, and said pivot block having the opening occupied by the shank flaring in the direction toward the trunnions.

14. The combination of a bracket, a coupler head, a shank extending rearwardly from the coupler head, a compression spring surrounding the shank and bearing against the coupler head, a universal joint connecting the shank with the bracket and comprising a block pivoted to the bracket, and a spring seat pivotally bearing against the block on an axis at right angles to the pivot of the block, the shank extending beyond the bracket, and to a stop on the end of the shank adapted to engage the rear edge of the bracket.

15. The combination with a supporting bracket, of a pivot block pivoted thereto and having an opening through it flaring toward the rear, a spring seat pivotally bearing against the front side of the pivot block by means of lugs on one of such members engaging recesses in the other, a coupler head, a shank extending therefrom through the spring seat and pivot block, and a spring between the spring seat and coupler head.

16. The combination of a supporting bracket, a pivot block having trunnions pivoting it to the bracket on a horizontal axis and having an opening through it flaring toward the rear and toward the trunnions, a spring seat having an opening through it and pivotally bearing against the front side of the pivot block on a vertical axis by means of a pair of lugs on one of such members engaging a pair of recesses on the other, one lug and one recess being located above the openings in the pivot block and spring seat and the other lug and recess below such opening, a coupler head, a shank extending therefrom through the spring seat and the pivot block, and a spring between the spring seat and coupler head.

17. The combination of a supporting bracket, a coupler head, a universal joint mounted on the bracket, a spring between the universal joint and coupler head, and means whereby the coupler head may be raised without constraining the spring but can only be depressed by constraining it.

18. The combination of a bracket, a pivot block pivoted thereto, said bracket having its under edge curved concentrically of the pivot of said block, the rear edge of the bracket being non-concentric, a coupler head, a shank therefor extending through the pivot block, a stop on the rear end of the shank adapted to engage the rear and part of the under edge of the bracket, and a compression spring between the pivot block and head.

19. The combination of a bracket having a pair of recesses, a pivot block having integral trunnions occupying said recesses, shoulders on the block to prevent lateral displacement thereof, a coupler head, and means including a spring tending to force the coupler head away from the bracket.

20. In an automatic train pipe coupling, the combination with a supporting bracket having two spaced depending arms at its lower end, a pivot block having integral trunnions arranged to engage said arms, said block having an opening through it between its trunnions, a head, a spring, and means pivotally connecting the spring and head with the block including a member movably occupying said opening and a member having a pivotal bearing against the block at right angles to the trunnions of the latter.

21. In an automatic train pipe coupling, the combination of a bracket, a pivot block pivoted thereto and having a laterally flaring opening through it, a connector head, a spring acting on the head and also on a member which has a pivotal bearing against the front of the block on an axis at right angles to the axis of oscillation of the block, said member being positioned by means passing through the flaring opening in the block.

22. In an automatic train pipe coupling, the combination of a bracket provided with an open-ended slot, a rigid pivot block having integral trunnions, one of which occupies said slot, a connector head, a shank extending therefrom across the pivot block, a shoulder on the rear portion of the shank bearing against the rear of the bracket, and a spring pressing the shank forwardly.

In testimony whereof I affix my signature.

MARTIN A. BARBER.